United States Patent
Vorobieff et al.

(10) Patent No.: US 10,006,443 B1
(45) Date of Patent: Jun. 26, 2018

(54) INFLATABLE, FREE-STANDING SOLAR UPDRAFT TOWER WITH OPTIMAL GEOMETRY AND ACTIVE CONTROL

(71) Applicants: Peter V. Vorobieff, Albuquerque, NM (US); Nima Fathi, Albuquerque, NM (US); Andrea A. Mammoli, Corrales, NM (US); Vakhtang Putkaradze, Edmonton (CA); Michael Chi, Edmonton (CA); Seyed Sobhan Aleyasin, Winnipeg (CA); Francois Gay-Balmaz, Paris (FR)

(72) Inventors: Peter V. Vorobieff, Albuquerque, NM (US); Nima Fathi, Albuquerque, NM (US); Andrea A. Mammoli, Corrales, NM (US); Vakhtang Putkaradze, Edmonton (CA); Michael Chi, Edmonton (CA); Seyed Sobhan Aleyasin, Winnipeg (CA); Francois Gay-Balmaz, Paris (FR)

(73) Assignee: STC.UNM, Albuquerque, NM (US)

(*) Notice: Subject to any disclaimer, the term of this patent is extended or adjusted under 35 U.S.C. 154(b) by 101 days.

(21) Appl. No.: 14/879,398

(22) Filed: Oct. 9, 2015

Related U.S. Application Data

(60) Provisional application No. 62/062,607, filed on Oct. 10, 2014.

(51) Int. Cl.
*B23P 15/26* (2006.01)
*F03G 6/04* (2006.01)
*F24J 2/00* (2014.01)

(52) U.S. Cl.
CPC ............. *F03G 6/045* (2013.01); *B23P 15/26* (2013.01); *F24J 2/0007* (2013.01)

(58) Field of Classification Search
CPC ... F03G 6/045; F03G 6/04; B23P 15/26; F24J 2/0007; Y02E 10/40; Y02E 10/465
(Continued)

(56) References Cited

U.S. PATENT DOCUMENTS 3,489,072 A * 1/1970 Secor ............ E04H 12/28
110/184
4,267,824 A * 5/1981 O'Halloran ............ F24J 2/06
126/601
(Continued)

FOREIGN PATENT DOCUMENTS

WO   WO 2008009785 A1 * 1/2008 ............ F03D 1/04

*Primary Examiner* — Patrick Maines
(74) *Attorney, Agent, or Firm* — Vogt IP; Keith A. Vogt

(57) ABSTRACT

The present invention provides a self-supporting chimney apparatus. The chimney apparatus having at least one inflatable compartment. In some embodiments, the chimney apparatus may have a plurality of toroidal compartments, with the dimensions of the toroidal compartments calculated to maximize the structural integrity of the chimney apparatus, and with the pressure in the compartments dynamically adjusted to minimize deflection under wind loading. The self-supporting chimney apparatus may be used to construct an improved solar updraft tower, with the shape of the tower, the greenhouse surrounding its base, and the ground under the greenhouse optimized together to minimize energy losses. The efficiency of the power plant based on the design is further enhanced by combining solar thermal energy generation with photovoltaic energy generation and utilizing the waste heat of the latter.

12 Claims, 9 Drawing Sheets

(58) Field of Classification Search
USPC .................................................... 60/641.14
See application file for complete search history.

(56) References Cited

U.S. PATENT DOCUMENTS

| | | | | |
|---|---|---|---|---|
| D347,248 S | * | 5/1994 | Franzman | .................... D21/424 |
| 5,527,216 A | * | 6/1996 | Senanayake | ............ E04H 12/28 |
| | | | | 454/1 |
| 5,575,738 A | * | 11/1996 | Millington | ............... A63B 5/11 |
| | | | | 472/135 |
| 5,779,512 A | * | 7/1998 | Rupert | ...................... B63C 9/13 |
| | | | | 441/123 |
| 5,813,946 A | * | 9/1998 | Lin | .......................... A63B 5/11 |
| | | | | 482/27 |
| 6,755,713 B1 | * | 6/2004 | Weber | ....................... A63H 5/00 |
| | | | | 446/143 |
| 2004/0207566 A1 | * | 10/2004 | Essig, Jr. | .................. F21S 11/00 |
| | | | | 343/878 |
| 2006/0272240 A1 | * | 12/2006 | Papageorgiou | ........... F03D 1/04 |
| | | | | 52/218 |
| 2007/0141925 A1 | * | 6/2007 | Turner | ................. A47C 15/006 |
| | | | | 441/129 |
| 2008/0220944 A1 | * | 9/2008 | Pratson | ................ A63B 21/068 |
| | | | | 482/52 |

* cited by examiner

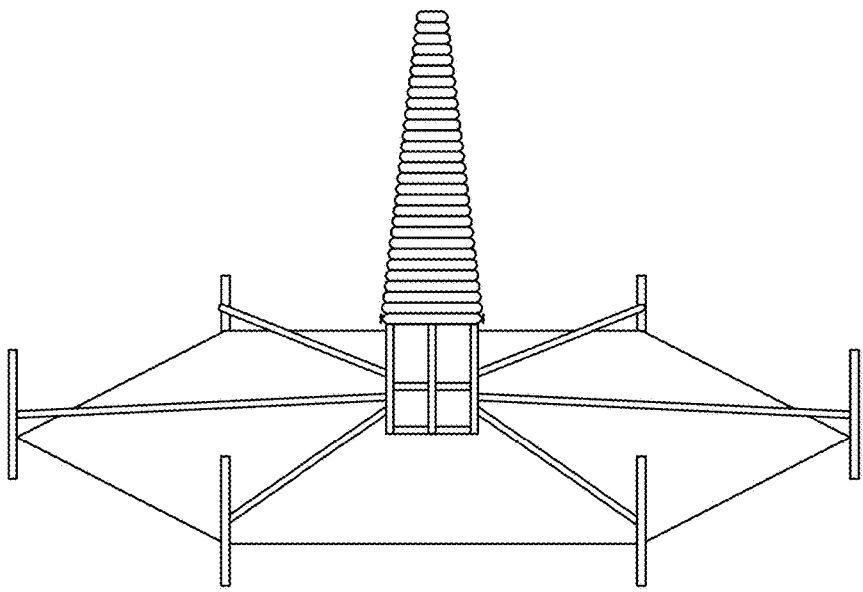
FIG. 7A
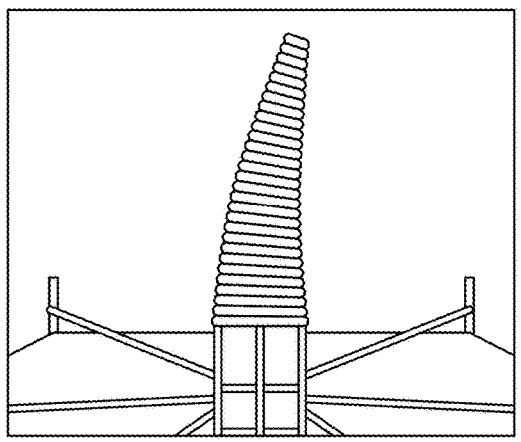    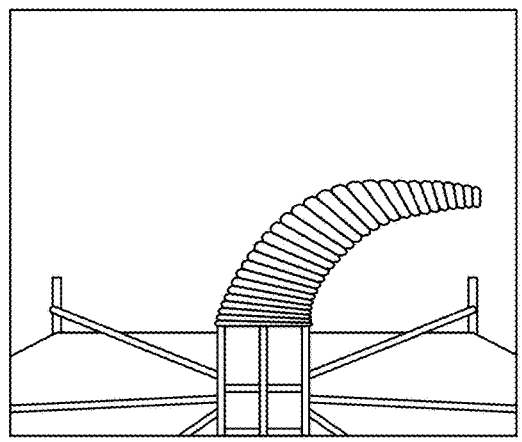
FIG. 7B          FIG. 7C

INFLATABLE, FREE-STANDING SOLAR UPDRAFT TOWER WITH OPTIMAL GEOMETRY AND ACTIVE CONTROL

RELATED APPLICATIONS

This application claims the benefit of U.S. Provisional Application No. 62/062,607 filed Oct. 10, 2014 and herein incorporated by reference.

STATEMENT REGARDING FEDERALLY SPONSORED RESEARCH & DEVELOPMENT

Not applicable.

INCORPORATION BY REFERENCE OF MATERIAL SUBMITTED ON A COMPACT DISC

Not applicable.

BACKGROUND OF THE INVENTION

Solar updraft towers (also known as solar chimneys) are a simple and reliable way to generate electricity using solar radiation and the principle of convection. Referring to FIG. 1, an example of a prior art solar updraft tower is shown. Such solar updraft towers may comprise: a base 20; collectors 10; and a tower 5. The collectors may comprise a greenhouse covering 12, and a heating space 14, which is formed between the greenhouse covering and the ground. The base may comprise heated air inlets 22, and turbines 26. Sunlight 1, passes through the greenhouse covering and heats up the air in the heating space. The heated air then flows through the air inlets into the base and up through the tower to reach the cooler mass of air located above the tower. This convection flow of heated air drives the turbines, producing electricity.

Solar updraft towers present a number of advantages. They may be constructed from relatively inexpensive and common materials and they do not require a continuous supply of water to operate. Also, because the designs typically incorporate huge thermal masses, the variability of their electrical output is very low and it is possible for them to continuously produce electricity. Finally, their designs are not maintenance-intensive; the only components that require regular maintenance are the turbines, which, in many designs, are located at ground level. These significant advantages notwithstanding, there are also shortcomings associated with the design of solar updraft towers. They require very tall, freestanding chimney structures to deliver heated air from the collectors up to cool masses of air located high above ground level.

Current solar updraft tower designs incorporate chimney structures constructed using traditional materials, such as steel. A taller chimney structure increases the efficiency of the solar updraft tower, but obviously also increases the cost of construction as well. Furthermore, as designs incorporating chimney structures 1,000 meters or taller have been proposed, the design of chimney structures presents a substantial engineering challenge. Finally, the potential for damage arising from the collapse of chimney structures constructed using traditional materials is high.

Another important shortcoming of the prior art solar updraft tower design is very low efficiency. Only between 0.5% and 5% of the incident solar energy is converted into electricity.

It is therefore desirable to provide a self-supporting chimney apparatus that overcomes the shortcomings of prior art chimney structures.

BRIEF SUMMARY OF THE INVENTION

In one embodiment, the present invention provides a self-supporting chimney apparatus. In other embodiments, the chimney apparatus may comprise sidewalls and a central passageway. The sidewalls may comprise at least one inflatable compartment, with at least one inflatable compartment being filled with a gas.

In some embodiments, the inflatable compartment may be formed by a single elongated bladder wound into a helical shape.

In some embodiments, the inflatable compartment may comprise a plurality of isolated toroidal compartments stacked coaxially on top of one another.

In some embodiments, each toroidal compartment may comprise a toroid tube and a central void. The toroid tube may have a large radius $q_i$, and an elliptical cross-section, with the elliptical cross-section having semi-axes $h_i$ and $r_i$, where i is the number of the toroidal compartment such that i=1 for the lowest toroidal compartment, i=2 for next toroidal compartment and so on until i=i for the ith toroidal compartment, with the ith toroidal compartment forming the top edge of the sidewalls.

In some embodiments, the large radius $q_i$ of each toroidal compartment may decrease as i increases such that the profile of the chimney apparatus may correspond to the shape of an exponential curve.

In some embodiments, the two semi-axes of the elliptical cross-sections of the toroidal tubes may be equal in length, meaning that $h_i$ may equal $r_i$.

In some embodiments, the structural integrity of the chimney apparatus may be optimized by defining N as the number of toroidal compartments and computing $q_i$ and $r_i$ for each i from i=1 through i=N by deriving and solving a differential equation for deformations, if the velocity of wind at the level of each torus is known, assuming that the force exerted by the wind on each toroidal compartment is proportional to the area of each toroidal compartment.

In some embodiments, the structural integrity of the chimney apparatus may be optimized by defining K as the number of toroidal compartments and computing $q_i$ and $r_i$ for each i from i=1 through i=K using a model that distributes deformations equally between the toroidal compartments of the chimney apparatus.

In some embodiments, the gas used to fill at least one inflatable compartment may be either air or a gas lighter than air (e.g., helium). The shape of the chimney may be optimized to accommodate specific wind loading and location of the turbine used to harvest electric power (near the bottom, at the top, etc.).

In some embodiments, the chimney apparatus may further comprise a gas supply system disposed to keep the inflatable compartments filled with the gas at a desirable pressure. The same gas supply system may be used to adjust the pressure within one or more or all of the compartments as well as to temporarily deflate the chimney (for maintenance, or to avoid damage from a catastrophic weather event).

In some embodiments, a procedure of real-time control of dynamics and stiffness may be applied to the inflatable components comprising the chimney apparatus by adjusting the pressure in the individual components and thereby reducing the overall deformation of the chimney under wind loading. This method may also be easily produced on smaller scales using composite elements made out of polymers with changeable elastic properties, depending on the applied current. This procedure allows for the use of metamaterials with easily changeable properties, such as surface drag, stiffness and others.

In yet other embodiments, the overall performance of the solar chimney apparatus and the greenhouse may be enhanced by selecting an axisymmetric shape for both the chimney, the greenhouse, and the ground under the greenhouse. Then the cross-section of the greenhouse and the chimney together is optimized to maximize the flow through the greenhouse and the chimney through geometric considerations, namely the use of a converging-diverging cross-section for the greenhouse, thereby increasing the air intake and minimizing pressure loss.

In some embodiments, the performance of the solar chimney apparatus may be enhanced by minimizing energy loss in converting the concentric flow through the greenhouse to vertical flow in the chimney by making the transition between the base of the chimney and the surrounding greenhouse gradual.

In some embodiments, a helical structure may be erected on the ground in the area underneath the chimney, to minimize energy losses in converting the horizontal concentric flow in the greenhouse into the vertical parallel updraft flow.

In some embodiments, the efficiency of the solar chimney power plant may be further enhanced by either placing photovoltaic (PV) solar panels inside the greenhouse or replacing portions of the roof of the greenhouse with them, and using them for electricity generation, at the same time utilizing the waste heat generated by the panels in contributing to the updraft flow.

Additional objects and advantages of the invention will be set forth in part in the description which follows, and in part will be obvious from the description, or may be learned by practice of the invention. The objects and advantages of the invention will be realized and attained by means of the elements and combinations particularly pointed out in the appended claims.

It is to be understood that both the foregoing general description and the following detailed description are exemplary and explanatory only and are not restrictive of the invention, as claimed.

BRIEF DESCRIPTION OF THE SEVERAL VIEWS OF THE DRAWINGS

In the drawings, which are not necessarily drawn to scale, like numerals may describe substantially similar components throughout the several views. Like numerals having different letter suffixes may represent different instances of substantially similar components. The drawings illustrate generally, by way of example, but not by way of limitation, a detailed description of certain embodiments discussed in the present document.

FIG. 7A shows an embodiment of the present invention in a vertical, non-bent configuration.

FIG. 7B shows the embodiment of FIG. 7A in a slightly bent configuration.

FIG. 7C shows the embodiment of FIG. 7A withstanding a 90° bend without kinking or occlusion of the central passageway.

DETAILED DESCRIPTION OF THE INVENTION

Detailed embodiments of the present invention are disclosed herein; however, it is to be understood that the disclosed embodiments are merely exemplary of the invention, which may be embodied in various forms. Therefore, specific structural and functional details disclosed herein are not to be interpreted as limiting, but merely as a representative basis for teaching one skilled in the art to variously employ the present invention in virtually any appropriately detailed method, structure or system. Further, the terms and phrases used herein are not intended to be limiting, but rather to provide an understandable description of the invention.

Figure 1:
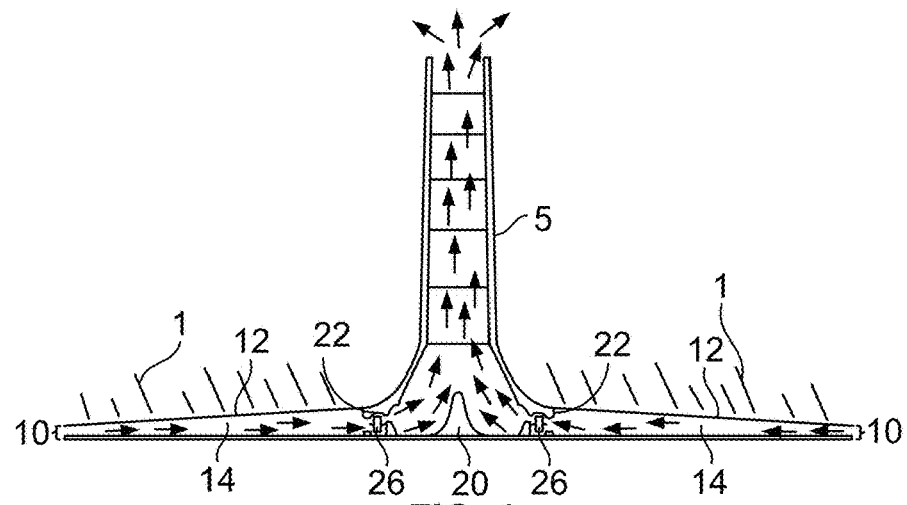
FIG. 1 is a cross-section side elevation view depicting a prior art solar updraft tower.
Figure 2:
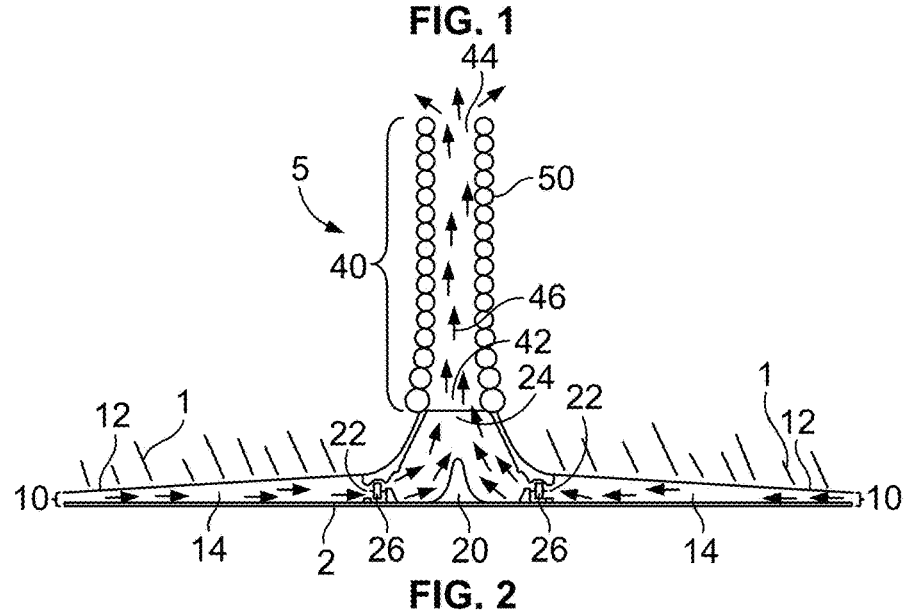
FIG. 2 is a cross-section side elevation view depicting one embodiment of the present invention.

FIG. 2 illustrates one embodiment of an improved solar updraft tower of the present invention. In this embodiment, improved solar updraft tower 5 may comprise base 20, collector 10, and self-supporting chimney apparatus 40. Collector 10 may comprise greenhouse covering 12. Heating space 14 may be formed between greenhouse covering 12 and ground 2. Base 20 may comprise heated air inlets 22, turbines 26, and chimney passage 24. Self-supporting chimney apparatus 40 may comprise toroidal compartments or components 50, lower or proximal opening 42, upper or distal opening 44 and central passageway 46. In other embodiments, the components may be comprised of other cross-sectional shapes that define an annular opening to create chimney passage 46.

Sunlight 1 passes through greenhouse covering 12 to heat air in heating space 14. Heated air from heating space 14 flows through heated air inlets 22, past turbines 26 and through chimney passage 24 of base 20 and into self-supporting chimney apparatus 40 through lower opening 42. Heated air then flows up through central passageway 46 and out of opening 44.

Figures 3A, 3B:
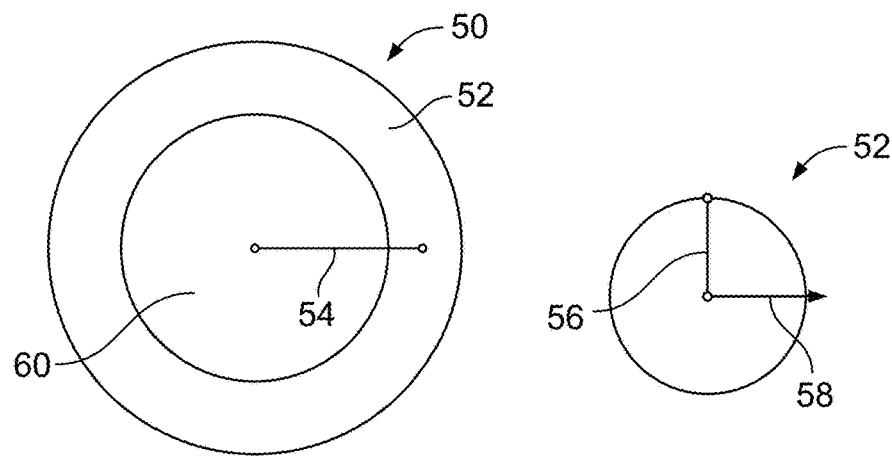
FIG. 3A is a top elevation view depicting one embodiment of a toroidal compartment used with an embodiment of the present invention.
FIG. 3B is a partial cross-section side elevation of one embodiment of a toroid tube.
Figure 4:
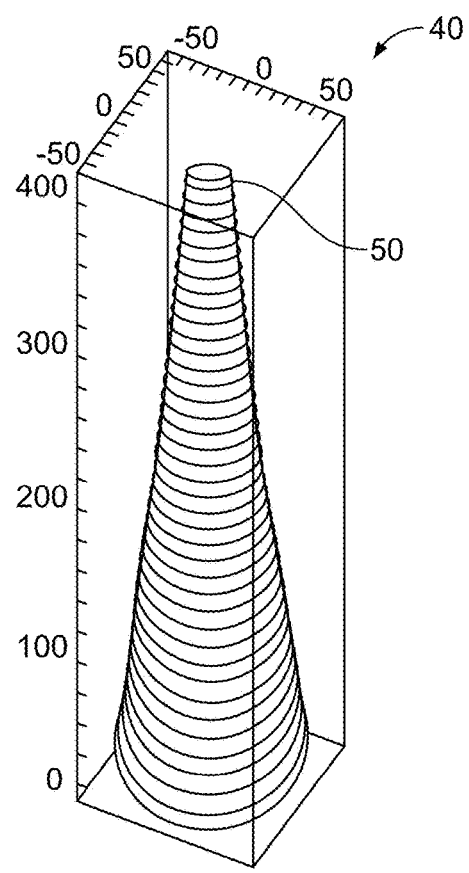
FIG. 4 is a perspective view of one embodiment of an optimized self-supporting chimney apparatus.
Figure 5A:
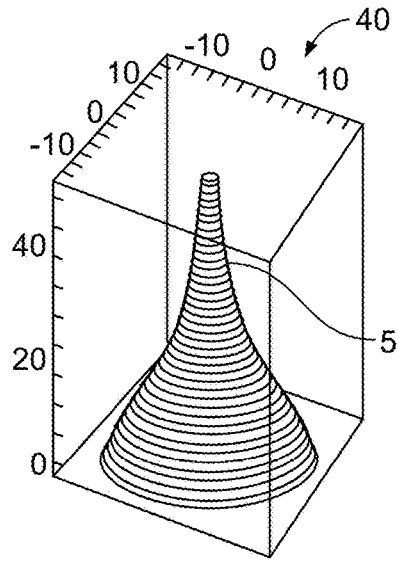
FIG. 5A is a perspective view of another embodiment of an optimized self-supporting chimney apparatus.
Figure 5B:
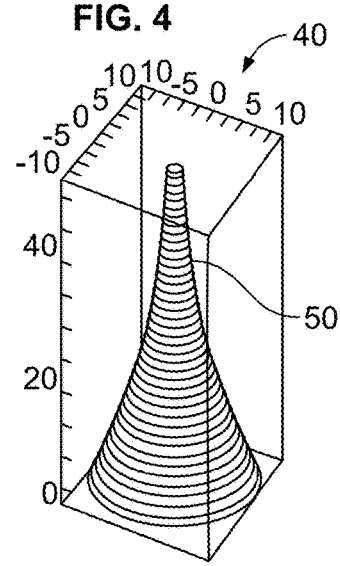
FIG. 5B is a perspective view of another embodiment of an optimized self-supporting chimney apparatus.
Figure 5C:
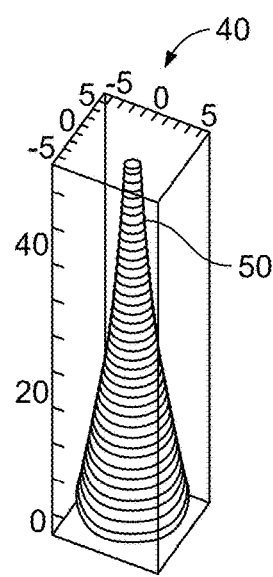
FIG. 5C is a perspective view of an embodiment of an optimized self-supporting chimney apparatus.

Referring to FIGS. 3A and 3B, one embodiment of a toroidal compartment is shown. In this embodiment, toroidal compartment or component 50 may have toroid tube 52 and central opening or void 60. Large radius $q_i$ 54 of toroidal compartment 50 may be defined as the distance from the center of central void 60 to the center of toroid tube 52. The elliptical cross-section of toroid tube 52 may have semi-axis $h_i$ 56 and semi-axis $r_i$ 58.

Referring to FIGS. 4, 5A, 5B and 5C, dimensions of toroidal components 50 may be optimized through various methods as set forth below. The optimization methods create various optimized versions of self-supporting chimney 40. Further referring to FIGS. 4, 5A, 5B and 5C, the pressure in the components 50 may be changed dynamically to minimize the deformation of the tower, as set forth in greater detail below.

In other embodiments, the present invention provides novel designs of solar chimney power plants that remedy shortcomings of the traditional design such as the prohibitive cost and fragility of the tall chimney and the low coefficient of performance of the power plant.

In several embodiments, the present invention provides inflatable, free-standing chimney 5 as shown in FIG. 2 as well as chimneys 40 shown in FIGS. 4, 5A, 5B and 5C. As shown, the traditional rigid chimney structure is replaced with a freestanding inflatable stack that can sway in the wind or, in the event of extreme weather, can be temporarily deflated. The stack is assembled from inflatable components 50 that may be toroidal elements of varying sizes filled with air or light gas, where pressure in each element can be adjusted individually. In other embodiments, geometrical shapes may be used for the inflatable elements. In yet other embodiments, a single helical element may be used.

For a preferred embodiment of the present invention utilizing toroidal-shaped inflatable bladders as the elements, as well as for other geometrically shaped components, the chimney design may be optimized for stability under wind loading. The concept underlying the solution for the chimney shape as a stack of tori is that under constant and uniform wind loading, the chimney can deflect from its vertical position, but the overall deformation may be achieved by the matching of bending of each chimney element, and there should be no sharply deformed elements or obstruction of airflow inside the stack. This may be achieved by using identical initial pressure in each element of the stack.

While the tower shape can be determined by assuming that the wind loading is constant, equations of motion of the tower can be derived to describe a more realistic dynamic motion of the tower. Using Lagrangian reduction by symmetry, a fully three-dimensional theory of motion of the tower is developed and used to study the tower stability and dynamics. Moreover, in yet other embodiments, additional optimal control is attained by using variable pressure in individual elements adjusted in real-time. The pressure adjustment is conducted to minimize large-scale tower deflection and vibrations induced by vortex shedding off the tower. Pressure in each tower element is adjusted by means of two valves. For reduction of overpressure, one valve vents gas in the element into the atmosphere. To increase the pressure within an element or component, a valve connecting the element to a high-pressure reservoir is opened. While the control application is intermittent, the high-pressure reservoir can be continuously replenished by a low-power pump run on solar power.

Figure 6A:
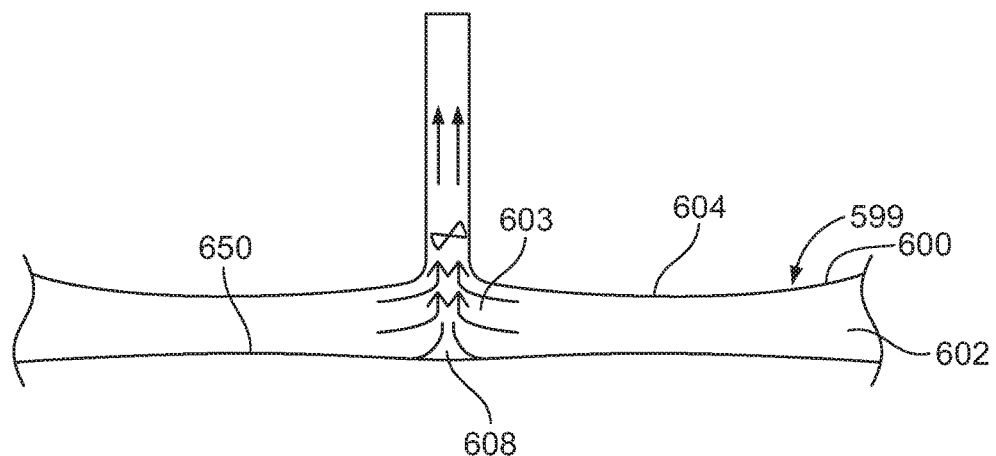
FIG. 6A is a side view of a geometrically optimized collector of an embodiment of the present invention.
Figure 6B:
FIG. 6B is a top view showing an arrangement of helical vanes that may be used with an embodiment of the present invention.
Figure 6C:
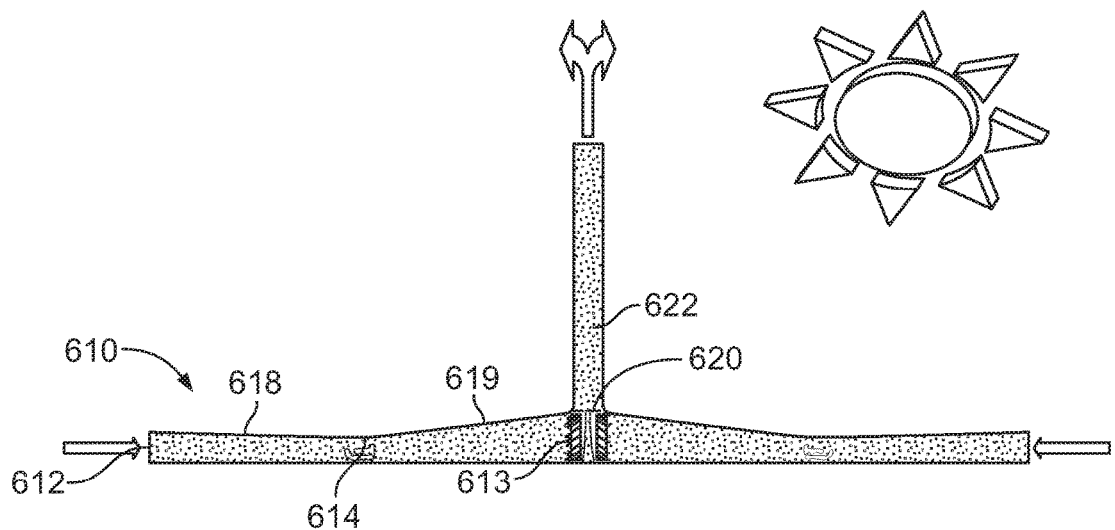
FIG. 6C is a side view of another embodiment of a collector of the present invention that is geometrically optimized.

In yet another embodiment of the present invention, the chimney and greenhouse geometry are optimized for maximum performance. In a traditional design, the greenhouse roof is flat (or rising toward center), and the transition between the greenhouse and the chimney is sharp, with resulting hydrodynamic losses contributing to the low coefficient of performance. In yet another embodiment of the present invention as shown in FIGS. 6A and 6C, the greenhouse 599 has a converging-diverging shape that facilitates improved airflow. As shown in FIG. 6A, roof 600 is curved to create a diverging-converging configuration where the size of the interior space is larger at inlet 602 and outlet 603 than at mid-section 604.

As shown in FIG. 6C, in yet another embodiment of the present invention, roof 610 uses linear segments to create a diverging-converging configuration where the size of inlet 612 and outlet 613 are larger than mid-section 614. As shown, linear segments 618 and 619 form roof 610. In addition, the size of the greenhouse at outlet 613 may be larger than at inlet 612.

The diverging-converging configurations create a transitional area that is shaped to facilitate gradual turning of the flow in the vertical plane, by combining a gradual elevation of the greenhouse roof. Also, in the horizontal plane, helical vanes 660 as shown in FIG. 6B, convert the axial motion of the flow as the flow enters the chimney and approaches the turbine.

By configuring the collector as described above, at least a 25% improvement of performance can be achieved. This result is achieved because losses during the transition between the flow in the greenhouse (horizontal, axially converging towards the stack) and the flow in the chimney (vertical, predominantly parallel) are mitigated.

In yet another embodiment, the present invention optimizes the shape of the greenhouse in order to maximize the power produced by the turbine by including greenhouses with non-flat bottoms. A nonlinear bottom advantageously increases the gas flow horizontally at the inlet of the collector and vertically of the outlook of the collector. Linear or flat bottom surfaces lead to large losses and momentum as a result of an abrupt change from horizontal motion to vertical motion within the collector. In addition, the sloping of the bottom of the greenhouse allows for the capture of solar energy during most of the day as a result of providing a surface that maintains more of an advantageous alignment with the movements of the sun. To achieve the above results, as shown in FIG. 6A, the shape of ground 650 may be configured to create diverging-converging configurations as shown.

Figure 8:
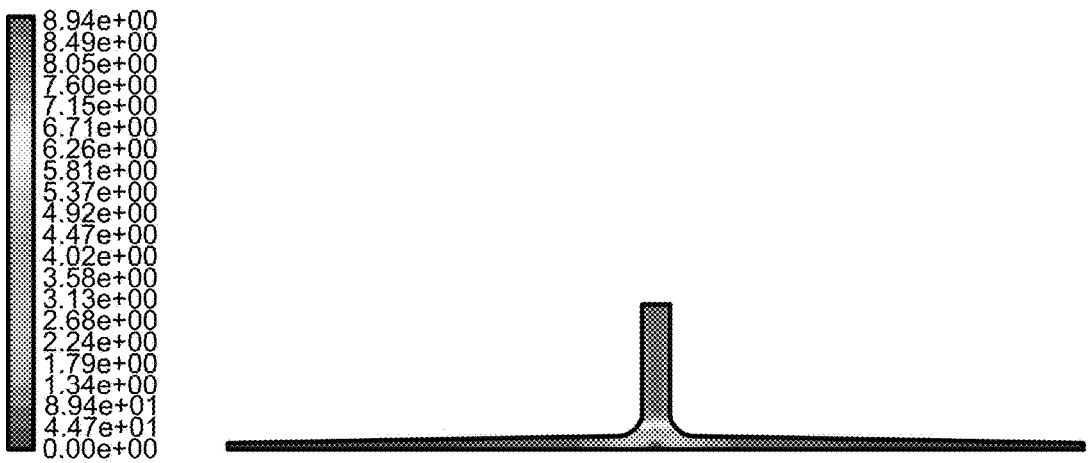
FIG. 8 shows a velocity contour plot of a traditional design of a solar chimney tower system (unit is m/s).
Figure 9:
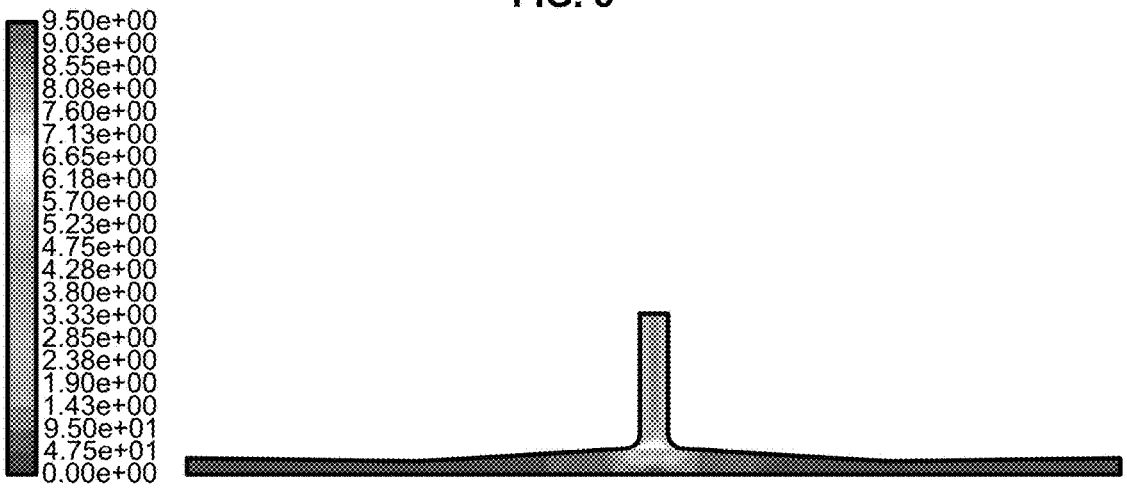
FIG. 9 shows a velocity contour plot of a solar chimney tower system of one embodiment of the present invention (unit is m/s) with an optimized roof changing the $h_{c,o}$.
Figure 10:
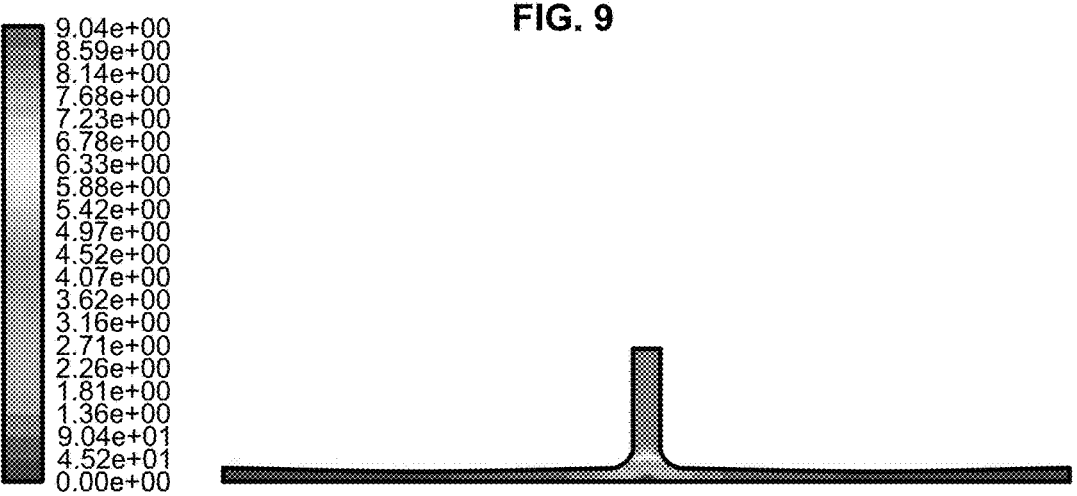
FIG. 10 shows a velocity contour plot of a solar chimney tower system of one embodiment of the present invention (unit is m/s) with an optimized roof without changing the $h_{c,o}$.

FIG. 8 shows the velocity contour plot of a traditional design that gives the mass flow rate of 3183.37 kg/s and the average velocity for the turbine at the inlet of the tower is 3.77 m/s. FIG. 9 shows a velocity contour plot of a collector using a diverging-converging roof. The resulting mass flow is 3174.48 kg/s which is less than the traditional design but the minimum available velocity for the turbine is 4.05 m/s. The harvestable kinetic energy of flow for the turbine for the traditional design is 22.622 kW but for this embodiment it is 26.034 kW. The diverging-converging designs described provide 15% more output energy from the solar chimney system. Moreover, by modifying the outlet area of the collector to make it larger than the inlet as shown in FIG. 6C, the mass flow rate is increased along with increasing the inlet velocity to the turbine. FIG. 10 shows the velocity contour plot of this embodiment by increasing the $h_{c,o}$ from 10 m to 14 m, the minimum average velocity for the turbine is 4.5 m/s and the outlet power available for turbine is 31.012 kW.

Consequently, using the diverging-converging profiles for the collector to increase the mass flow rate, the harvestable power can increase by at least 14%. By increasing the height of the collector at the outlet position of collector, collector power can increase up to 37%. Increasing the volume of the collector is another advantage of using a converging-diverging design for the collector of the solar chimney tower system of the present invention.

In yet another embodiment, the present invention provides an air-filled tower that is self-supporting with its shape optimized to take into account the wind pressures, as shown in FIGS. 2, 4 and 5A-5C. The tower's rigidity is designed in such a way that the deformation along the tower is controlled. In some aspects, an exponential shape is optimal for some configurations since it minimizes the torques acting on a given cross-section. Another advantage of the exponentially-shaped surface is to distribute deformations substantially equally or equally along the tower.

Moreover, since the tower is filled with air, maintaining the desirable pressure in each individual bladder, which may be toroidal in shape, may be achieved with a simple arrangement of valves and pumps. Such a system may be used to accommodate changing wind strengths or winds that are strongly varying with elevation. In yet other aspects, the bladders may be filled with a lighter-than-air gas, e.g., helium, to support the weight. However, as it turns out, filling these bladders with air is not only highly economical, but allows for solving the issue of tower stability in a much more efficient way.

Configuring the shape of the tower to deform in the optimal fashion under the wind, has the additional advantage that the load on each bladder from the weight of the chimney above it is approximately proportional to the size of the bladder itself. Thus, the extra pressure generated by the supporting weight in each bladder that is distributed over the respectively larger volumes of the bottom tori will be very small. In addition, there are extra stability advantages achieved by filling the bladders with air, is discussed in detail below.

In other embodiments, the configuration of the tower should be designed to resist the creation of a "break" (i.e., a sharp bend forcing flow blockage) in the tower under the wind force by distributing deformations equally or substantially equally, along the tower. To achieve this, consider two tori in contact, for example, the tori numbered k and k+1. These tori have small radii $r_k$ and $r_{k+1}$ in contact correspondingly. Let $h_k$ and $h_{k+1}$ be the maximum normal deformations of the kth and k+1st torus. Assume that the excessive pressure inside these tori is $p_k$ and $p_{k+1}$ and the deformations are small, so the total volume and pressure change of each torus is negligible. To the first approximation, one can assume that the area changes linearly away from the maximum contact. The typical width of the contact area of torus k and k+1 on the side of kth torus is given by $\sqrt{2r_k h_k}$.

Figure 11:
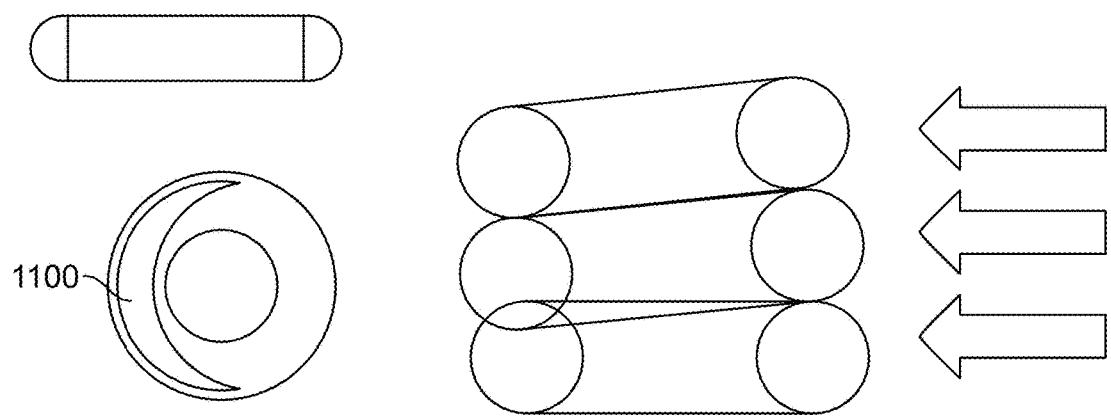
FIG. 11 illustrates the construction of a tower using toroidal bladders for an embodiment of the present invention.

The total area of the shaded, sickle-like contact area for the torus k 1100, as illustrated in FIG. 11, can be estimated by multiplying half of the perimeter of kth torus exposed to the deformation $\pi q_k$ by the typical contact width $\sqrt{r_k h_k}$ to give $$S_k \approx \pi q_k \sqrt{r_k h_k}. \tag{1}$$

The above is an estimate since the detailed dimensions of sickle-like shape depends on many factors. For example, the way adjacent tori are attached to each other and whether vertical gaps between tori are allowed in the upwind direction will influence the dimensionless pre-factor in that expression. However, the important feature is the square root singularity, which will be discussed immediately below. Technically, there is a factor of an order 1 in Eq. (1) that takes into account unequal forces along the torus: they are higher at the maximum deformation point and diminish away from it, resulting in the sickle-like shape of deformation 1100 as shown in FIG. 11. This pre-factor also incorporates $\sqrt{2}$ from the typical width of the sickle-like area. However, this pre-factor can be incorporated into the dimensionless parameter V introduced below (see Eq. (9)), so it will not be considered here.

The tilt of the kth torus with respect to the vertical may be defined to be $\phi_k$. A sketch of the tori in contact is shown in FIG. 11. Then, in the most basic approximation, assuming the tori were in contact initially, the deformation of the torus at contact is computed by the change of coordinates of the torus and its neighbors. Since the deformations are caused by the wind, the wind direction is assumed from the right, and denote the variables as being "upwind" (subscript u) and "downwind" (subscript c/). Assuming that the angle is computed as positive counter-clockwise and remains small, the deformations are given by the formulas:

$$h_{k,u} = |q_k \phi_k - q_{k-1} \phi_{k-1}|, h_{k,d} = |q_{k+1} \phi_{k+1} - q_k \phi_k|. \tag{2}$$

Notice that $h_{k+1,u} = h_{k,d}$, coming from the fact that the tori are attached so they keep continuous, persistent contact throughout their perimeter at all times. The deformation $h_{k,u}$ (and similarly $h_{k,d}$) consists of two parts: the positive part contributed by the tilt of the kth torus, assuming the positive angle is measured counterclockwise, and negative shift of the k−1st torus. The absolute value sign accounts for cases when the deformation happens on the upwind or downwind part of the tower. For static configurations considered, the compressed area is always on the downwind side.

The net torque acting on the kth torus computed with respect to its center is thus $T_k = q_k \times F_k$ where the applied force F is computed from $F_k = S_k p_k$, the deformed area times excessive pressure in the kth torus. From Eq. (1), it is obtained $$T_k = q_k p_k \cdot \pi q_k \cdot (s_k \sqrt{2 r_k |h_{k,d}|} - s_{k+1} \sqrt{2 r_k |h_{k,u}|}). \tag{3}$$

Figure 12:
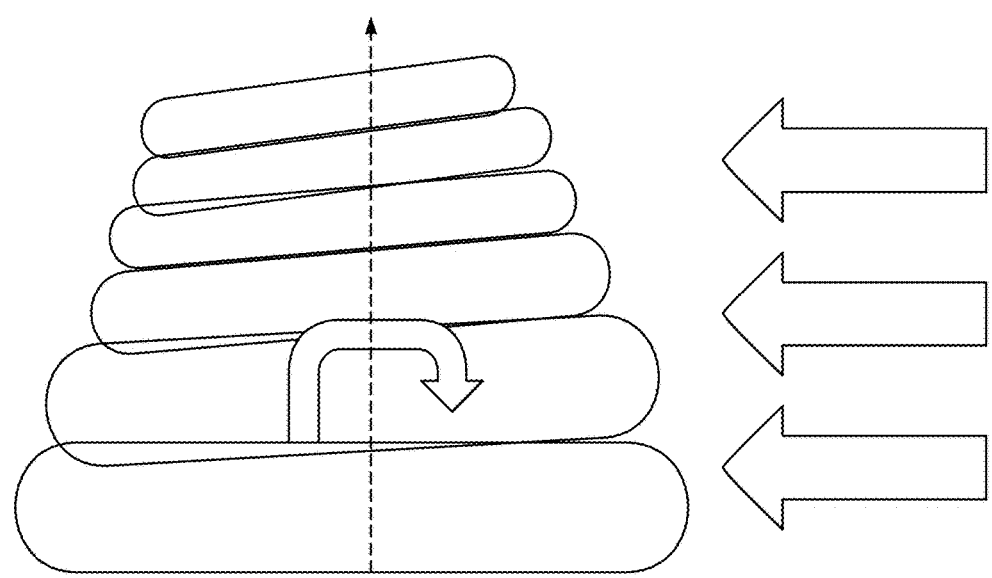
FIG. 12 illustrates the concept of torque balancing as implemented by an embodiment of the present invention.

The sign convention assumes that the downwind part of the deformation generates clockwise torque, as shown in FIG. 12, taken with the positive sign. Here $p_k$ is the excess pressure in the kth torus. The factors $s_k = \text{sign}(\phi_k - \phi_{k-1})$ define the direction of the torque. Indeed, if the local relative tilt of the tower changes the direction, the contact area shifts from the upwind to downwind part of the torus, i.e. the darkened sickle-like contact shape on the left of FIG. 11 abruptly shifts to the other side of the torus, contributing to the change of sign in the torque expression $T_k$. For steady states of equally pressurized tori ($p_k = P = \text{const}$) that is considered below, the angles $\phi_k$ can be assumed to be monotonically increasing, so $s_k = 1$.

This torque defined by Eq. (3) has to balance the torque due to the wind acting on all the tori above the kth torus. The cross-section of the torus exposed to the wind is $A_k = -r_k (\pi r_k + 2 q_k) \cos \phi_k$. Then, the magnitude of the force on the ith element is computed as $$F_i = C_d U_i^2 A_i \cos \phi_i \approx C_d U_i^2 r_i (\pi r_i + 2 q_i) \cos \phi_i, \tag{4}$$

where $U_i$ is the average wind velocity acting at the elevation $z_k$ and, correspondingly, $R_i$ is the Reynolds number of the ith torus. Here, $C_d$ is, for simplicity, assumed to be the drag coefficient of a single torus which is typically of order 1 for large values of properly defined Reynolds numbers. Then the torque due to wind resistance (as denoted by subscript w) above the kth torus is $$T_{k,w} = \sum_{i=k+1}^{N} (z_i - z_k) F_i, \tag{5}$$

and the condition for the equilibrium is simply $T_{k,w} = T_k$ for each k, where $T_k$ is given by Eq. (3) and $T_{k,w}$ by Eq. (5). More precisely, we get a system of coupled, nonlinear difference equations for $\phi_k$ as follows:

$$p_k \pi q_k^2 (s_k \sqrt{2 r_k |q_k \phi_k - q_{k-1} \phi_{k-1}|} - s_{k-1} \sqrt{2 r_k |q_{k+1} \phi_{k+1} - q_k \phi_k|}) = \tag{6}$$
$$\sum_{i=k+1}^{N} C_d U_i^2 r_i (\pi r_i + 2 q_i) \cos \phi_k (z_i - z_k).$$

In other aspects, the present invention finds the geometry of the tori and corresponding shapes of the tower that optimize deformations along the tower for uniform winds. It may seem like these forces are singular when no deformations are present and thus must be avoided, for example, by regularizing this force and taking into account small deformations caused by the static weight of the tori at rest. This indeed will make the reaction forces linear for small angles and square root like for large angles. However, dealing with the square roots is advantageous. First, for any reasonable wind speeds, the deformations will be described by the square root, rather than the small deformation regularizations, so the square root is truly physical. Second, this singularity is in restoring force, which means that the restoring force is faster than any linear force could have been, and thus the system is, loosely speaking, more than linearly stable.

Under the influence of strong winds, the tower will deform according to Eq. (6). While deformation, even a large one, may be acceptable in a flexible structure, for the present invention it is desirable to enforce the uniformity of this deformation along the tower. The vertical compression of any torus caused by the wind has to be a fraction u of the radius of that torus, with u being the same for all tori. This way, the relative deformation caused by the wind is equally distributed along the tower and makes it less likely for the air flow in the tower to be blocked.

This condition, expressed in formulas, enforces $h_k = u r_k$, where $h_k$ is both the upwind and downwind parts defined by Eq. (2). Let us for convenience non-dimensionalize the excess pressure $p_k$ in each torus using, e.g., the atmospheric pressure $p_0$, so that $P_k = p_k / p_0$. Thus Eq. (6) now defines a set of conditions for $q_i$ as follows:

$$P_k \pi q_k^2 p_0 \sqrt{2 \mu} (r_k - r_{k+1}) = f \sum_{i=k+1}^{N} r_i (\pi r_i + 2 q_i)(z_i - z_k), \tag{7}$$
$$k = 1, \ldots N - 1$$

Since f also has units of pressure, it can set $$\mu = \frac{1}{2} \left( \frac{V f}{p_0} \right)^2, V \text{ dimensionless} \tag{8}$$

so that the constant V is the sole dimensionless dynamic parameter containing the information about loading due to the wind and reaction forces.

The numerical value of the parameter V for design of a particular tower should be chosen in such a way that for typical winds in the area the tower should be fully operational. For example, the value V=2000 that was selected for a preferred embodiment facilitates continuous operation for sustained winds on the order of 10 m/s. If stronger winds are anticipated, the tower should be simply deflated since it does not make sense to plan for uncommon, extremely high, hurricane-strength winds (say, 35 m/s and above), as this will lead to small values of parameter V and, correspondingly, to a tower which is very inefficient for energy production due to severe constriction on the top.

With this convenient rescaling using V, Eq. (7) becomes:

$$V P_k \pi q_k^2 (r_k - r_{k+1}) = \sum_{i=k+1}^{N} r_i (\pi r_i + 2 q_i)(z_i - z_k), \tag{9}$$
$$k = 1, \ldots N - 1.$$

The optimization proceeds as follows: Specify the desired geometry of the tori, which is obtained from either engineering or economy reasons. Perform computations for two particular examples: (a) all tori are the same small radius, $r_k=R$, and (b) all tori are similar in shape, so $r_k/q_k$=const. Specify the geometry of the top torus only, i.e., $q_N=q_T$. This scale is normally determined from engineering considerations, such as the power of the turbine and the cost of the apparatus. One can further adjust excessive pressures $P_k$ to improve the flow of air through the tower by changing its shape, for example, increase the diameter of the upper tori. Generally, higher pressures $P_k$ lead to larger diameters on top and smaller on the bottom. Thus, assume that $P_k$ are chosen to be the maximum possible for each torus, limited by the fabric strength, and assume $P_k=P$ for all k in what follows. Using typical wind for the area, estimate the parameter Vin (9). Solve for tower shape, i.e. determine $q_{N-1}$, $q_{N-2}$, etc. recursively from (9).

To first illustrate the results of the optimization procedure when for all $r_k$ being the same, $r_k=R$ for k=1, . . . , N. The advantage of this procedure is that the shape $q_k$ can be computed explicitly by defining the top torus' geometry, i.e. $q_N$ and $r_N=R$.

This equation can be solved by specifying the scale, say $q_N=q_T$— the radius of the top torus—and proceeding to $q_{N-1}$, $q_{N-2}$ and so on until reaching $q_1$. Once the sequence of radii $q_N$, $q_{N-1}$, . . . , is obtained, an arbitrary part of this sequence may be selected and it will satisfy the optimization condition as well. This fact may be used to remove the expanding part of the tower developing for the step from N to N-1 unless the constant V is chosen to have a particular value.

Figure 13:
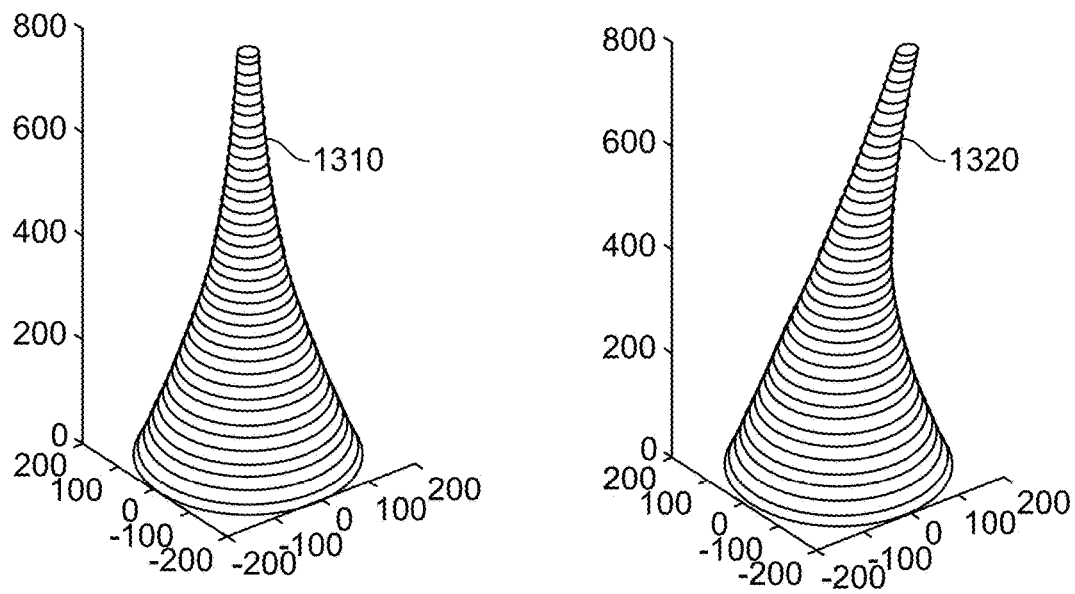
FIG. 13—Left: solar tower computed from Eq. (9) with V=2000. The radius of the bottom torus is roughly 200 m, top torus 10.5 m, the tower height is 800 m and the inner diameter of each torus is 10 m (leading to a rather severe constriction on top). Right: the same solar tower with the relative maximum deformation $\delta R_k$ for each torus being 1% of the smaller radius $R_k=R$. Since the radius $q_k$ of the tower is smaller at top, and $R_k=R$=const, the tilt (arc tan $(h_k/q_k)$) is correspondingly larger for the top tori.

For this calculation, assume that all $z_i$ to be equally spaced, so that $z_i-z_k=H(i-k)$. Also assume that all the tori are inflated to the same pressure $P_k=P=1$, meaning the excessive pressure in each torus is equal to the atmospheric pressure. FIG. 13 shows a tower shape 1310 obtained from Eq. (9), with V=2000. The radius of the bottom torus is roughly 200 m, top torus 10.5 m, the tower height is 800 m and the inner diameter of each torus is 10 m (leading to a rather severe constriction on top). For the same solar tower 1320, with the relative maximum deformation $\delta R_k$, each torus is 1% of the smaller radius $R_k=R$. Since the radius $q_k$ of the tower is smaller at top, and $R_k=R$=const, the tilt (arc tan $(h_k/q_k)$) is correspondingly larger for the top tori.

In another embodiment, the present invention provides a tower design using similar tori, when $r_k=\alpha q_k$ with a being a given number, common for all tori. Such a selection means that all the tori are similar in shape, but vary in size. For a proportional design, considering $q_k$ as the unknown variable in (9) gives an implicit equation for $q_k$ as a function of $q_{k+i}$:

$$VP_k\pi\alpha q_k^2(q_k+q_{k+1}) = \sum_{i=k+1}^{N} r_i q_i(\alpha\pi+1)(z_i-z_k), \quad (10)$$

$$k=1,\ldots N-1.$$

with $$z_{k+1}-z_k=2r_k=2\alpha q_k. \quad (11)$$

Figure 14:
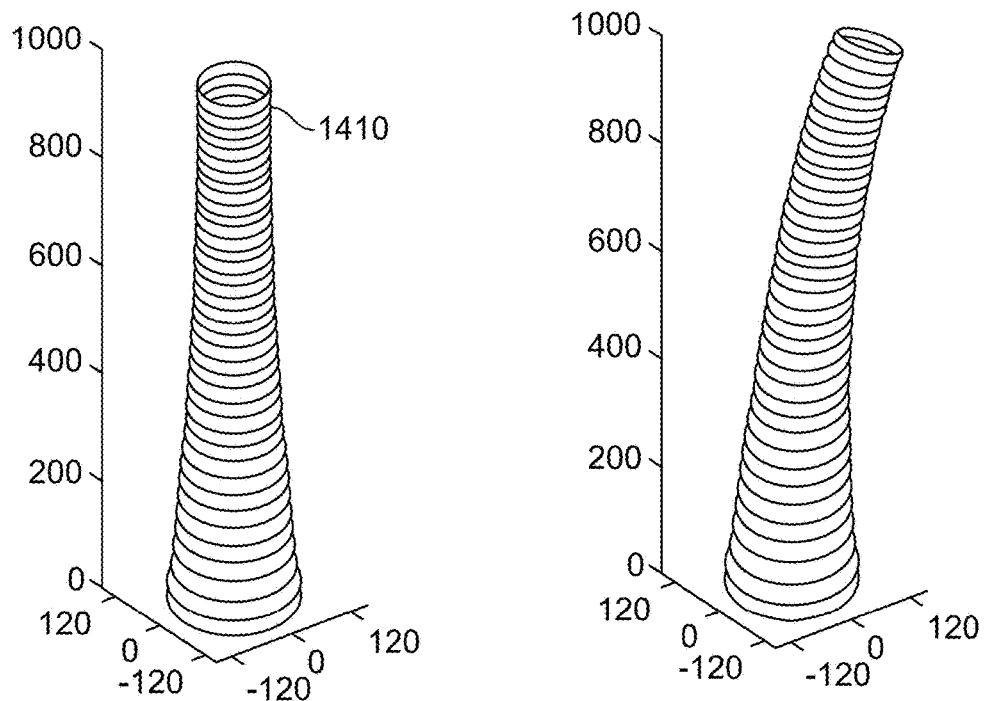
FIG. 14—Left: solar tower computed from Eqs. (10) and (11) with V=2000. The ratio of smaller to larger radii of all tori is assumed to be 0.1. The radius of the top torus is 50 m, the radius of the bottom torus is 88.4 m. Right: the same solar tower with the relative tilt for each torus being 1%.

Eqs. (10) and (11) must be solved simultaneously, as coupled implicit equations. Starting with $q_N:=q_T$ as before, and choosing, for example, $z_N=0$, the present invention finds $q_{N-1}$ and $z_{N-1}$, followed by $q_{N-2}$ and $z_{N-2}$ and all the way to $q_1$ and $z_1$. Since $z_k$ only enters the equations in a difference with other $z_k$, the present invention can choose $z_1=0$ by a simple shift. In FIG. 14, the present invention shows the results of simulations with V=2000 and $\alpha=0.2$. It also shows the tower deformed under the wind force. It is clear that such a procedure is advantageous to the optimization procedure defined in FIG. 13, as the constriction of the tower is much less severe at the top. The proportional tower design is clearly advantageous over explicit designs: for the same values of the parameter V, corresponding to the same wind speed tolerances, the proportional tower design is much less restrictive with regard to the air flow inside the tower. Conversely, taking the tower deigns obtained by the fixed-height and proportional methods with similar levels of internal flow constriction, the fixed-height design would have had considerably less tolerance to wind.

The above calculations were based on rather simple and crude estimates of the wind forces for each individual bladder. However, it is certainly true that the wind resistance is far more complex than assumed here, so pre-inflating each bladder to the computed pressure will not produce exactly the desired deformation profile in practice. This problem can be dealt with by controlling the pressure in each bladder in real-time, using the deformation of the tower as a guide. This procedure can also accommodate arbitrary change of wind speed away from the surface, thus adding robustness to the tower construction.

Consider, for the moment, the idealized situation where all the forces on each bladder are known, and the need to compute the pressures $P_k$, yielding a given deformation profile, namely, the set of deformation angles $\phi_k$. This problem can be solved exactly even in the more complex formulation of Eq. (6), as the left-hand side of the equation is proportional to $p_k$, and the right-hand side is independent of $p_k$, so the solution is computed simply as $$p_k = \frac{\sum_{i=k+1}^{N}(z_k-z_i)F_i}{\pi q_k^2\left(s_k\sqrt{2r_k|q_k\phi_k-q_{k-1}\phi_{k-1}|} - s_{k-1}\sqrt{2r_k|q_{k+1}\phi_{k+1}-q_k\phi_k|}\right)}. \quad (12)$$

This solution is simple, but of course too idealized. In reality, the forces on each bladder are not known. However, the deformations of the tower can be measured in real-time. This can be accomplished by either scattering a light from small reflective elements attached on the outside of the tower, analyzing tower shapes from on-site visual observations, installing small beacons (possibly including GPS units) along the tower, etc. Thus, if we consider $\phi_k$ to be known from observation, and also $p_k$ known from valve and pressure sensors, then from the equilibrium conditions (Eq. (6)) the present invention can determine $F_i$, i=1, . . . , N by solving a linear system. Once $F_i$ are known, the present invention can solve Eq. (12) to determine the pressures necessary to equilibrate the tower to the desired configuration. The pressures in each bladder may have to be adjusted accordingly. Unfortunately, this will alter the shape of the tower and thus change all $F_i$, and the process would need to be repeated. However, the procedure converges, so the desired configuration can be reached, provided that the time necessary to adjust the pressures in the bladders is much smaller than the typical time of the wind change.

To assist a tower in supporting its own weight, in a preferred embodiment, the cross-section of the tower and thus the weight of each torus is decreasing rapidly with height. It is most convenient to illustrate this for the case of an exponential tower. In that case, the weight of all the bladders, including extra air, above a given level is always roughly equal to the fraction of the weight of the bladder itself. This can be seen as follows. Let us assume that the mass of the bottom bladder is $M_0$. Then, the mass of the kth bladder roughly equals $q^k M_0$ with $0<q<1$, up to algebraic corrections in k (such as $k^2$) which grow much slower than $q^k$. Then the mass of all the bladders above the kth bladder is $$\sum_{i=1}^{N} M_i = \sum_{i=1}^{N} q^i M_0 = q^{k+1} M_0 \frac{1-q^{N+1}}{1-q} \simeq \frac{q}{1-q} M_k. \quad (13)$$

Since the radius of the bladder also decreases exponentially with k, the larger bladders on the bottom will have proportionally more area to support the extra weight. This translates into roughly equal deformation relative to the bladder's size.

A more precise calculation for the shapes shown in FIG. 13 gives the relative deformation of each bladder in the inflated state to be about 1% of the radius of each bladder, for the conditions used in the computations for these figures, and correspondingly produces no appreciable change in the pressure. Thus, the towers will have no difficulty supporting their own weight.

The heavier-than-air design of the towers has additional effects on the stability. As discussed above, the use of the ambient air for inflation radically simplifies addition of air into the towers. The tower can be built to remedy small leaks appearing in bladders with a pump and valve system. The use of ambient air also allows additional control of the tower rigidity by inflating and deflating each individual bladder. Due to a very large support system and optimized wind torque application, the tipping of the tower is unlikely, and the base of the tower will not detach from the ground even under strong wind loading. Should one of the bladders develop leaks too strong for the pumps to compensate for, it can be simply deflated. The tower's center of mass, as well as the center of torque application, will move downward, and the tower will remain stable. This will allow the tower to operate until necessary repairs are ready to be made. Because of the use of the ambient air, should repairs be needed, e.g. to repair a leaking bladder, all the tori below it can be deflated and then re-inflated again, making it possible to conduct all repairs at or near ground level. If the tower is built in an area prone to excessively strong winds exceeding design tolerances, due to e.g. hurricanes or tornadoes, then the tower can be deflated when such an inclement weather is approaching and reinflated when it has passed.

In yet other embodiments, the present invention includes a careful cost study for the construction of a solar-chimney power plant with an inflatable tower that should be conducted together with a parametric investigation of the proposed plant geometry, performance, appropriate materials and components, etc. Below are some preliminary considerations suggesting that the inflatable design may not just simplify the construction, but bring along substantial cost savings when compared with the rigid-tower design.

Costs of the construction of full-scale solar chimney plants with a rigid chimney have been assessed by Schlaich (1995), Schlaich et al. (2004), Bernardes (2004), and recently by Fluri et al. (2009) for comparable power plants (output 100 MW, chimney height between 850 and 1000 m). However, the estimates of the cost of the chimney varied rather strongly—from the best case of €68 million to €156 million. Notably, the chimney represents at least about 20% and likely as much as about 40% of the total cost of the construction. Any cost estimate of the inflatable towers of the present invention would involve a large inherent uncertainty, simply because there are few, if any, precedents for building kilometer-sized inflatable structures. One estimate that appeared in the literature relates to a free-floating buoyant tower using the design originally proposed by Papageorgiou (2004). The estimate presented in the paper by Zhou et al. (2009) is USD 30 million, which includes the costs of gas (helium) and rigid structural elements necessary for that construction. This suggests that the free-standing solar towers of the present invention might be even cheaper.

A crude cost estimate for the solar towers proposed herein may be obtained using the pricing of a mass-produced inflatable structure similar in size to the basic element of the chimney described above, namely the torus. Pre-fabricated spherical coated-fabric helium-filled advertising balloons (diameters~8 m) are commercially available from a variety of sources for about USD 800. One can theoretically use the same fabric, although modern film materials, such as Tedlar (2012) may be more appropriate, as they have superior resistance to wear and elements, and lower cost. Estimating the cost (scaled up about sixfold from an 8 m balloon to a 50 m torus) as USD 5000 per torus on average, which should also include the air valve and pressure sensor, then the rough estimate for the cost of fabricating a 1 km tall tower suitable for a 200-MW plant and consisting of 500-1,000 tori would be USD 5 million (or, €3.8 million, using a 1.316 conversion rate). The inflatable tower design also saves on foundation work and transportation costs, as compared with the rigid towers. Thus it is reasonable to expect that the cost of the inflatable tower will be at least several times lower than that of the rigid tower. Moreover, the difference in costs is likely to increase with chimney height.

An additional possibility of savings involves the turbine(s) used to produce electricity. For a traditional cylindrical tower, these turbines are of modest sizes and can be installed in a ring at the bottom of the tower, with the axis of each of turbine parallel to the ground. An alternative is a single turbine 620 (again, of relatively modest size) coaxial with 622 tower and located near inlet 613 as shown in FIG. 6C. In the case of the inflatable chimneys of the present invention, however, the shape of the tower is dictated by stability requirements, the extra mass near the top due to the turbine can be offset via buoyancy, and the maintenance procedure can be simplified by the ability to bring the turbine down to ground level via controlled deflation of the tower.

With a wide-based tower shown in FIG. 13, it may be possible to use a single turbine with a vertical axis located at the inlet, or a smaller turbine near the exit. To determine an optimal configuration, numerical modeling with the goal to assess the effect the tower shape has on the overall performance of the chimney was performed. The simulations assumed a tower height of about 1 km. For this height, both the differences in temperature and in pressure at the bottom and the top have to be taken into consideration. The simulation modeled both the chimney and the collector. The conditions at the entry of the collector are assumed as follows. Air enters the greenhouse at pressure 1 atm (101.3 kPa). Assume the unheated air outside the greenhouse is at $T_0=20°$ C. The temperature of the ambient air near the chimney exit can then be calculated using the standard value for atmospheric lapse rate, with the average drop of temperature with elevation estimated at 6.5° C. per km. Pressure at the exit is calculated using the standard barometric formula $p(z)=p_0 \exp(-Mgz/RT)$, where z is the elevation, $p_0$ is ground pressure, M is molar mass, R is gas constant, and T absolute temperature. By setting M=29 g/mol for air, this simple formula based on ideal-gas considerations is remarkably accurate (within 5% for elevations below 6 km) in predicting the pressure change with elevation. The numerical model has to take buoyancy into account.

For modeling, three tower geometries were used: one based on the fixed-height solution (FIG. 13), one based on the proportional solution (FIG. 14 straight tower 1410 with the same vertical cross-sectional area as the proportional tower. The modeling did not directly account for the presence of the turbine, but in numerical calculations for each geometry, three values of the pressure drop at the exit were considered. The first was zero. The second and the third were selected to represent characteristic values of pressure drops due to the use of a turbine at the bottom or at the top of the chimney.

Figure 15:
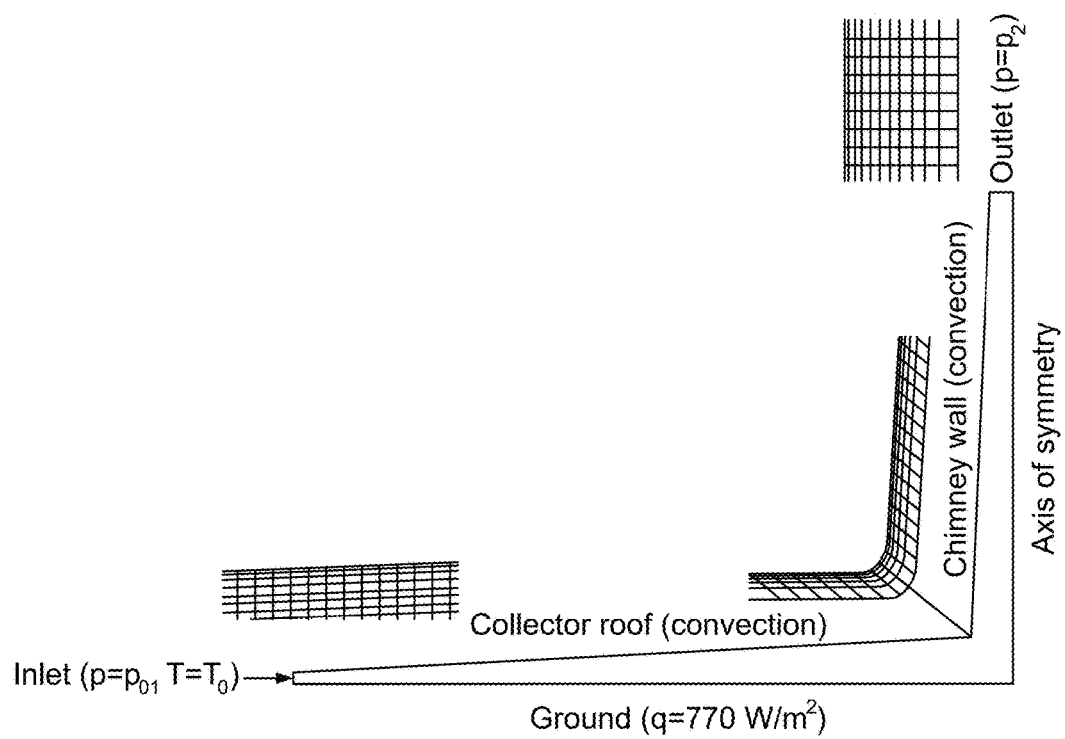
FIG. 15 shows computational domain, boundary conditions, and close-ups of the grid for numerical modeling (proportional tower shape). For clarity, the most sparse grid is shown (50,000 nodes). The actual calculations used a finer grid with about 10 times more elements.

The numerical simulation assumes the flow of air in the chimney is steady (in the average flow sense) and axisymmetric. Based on the characteristic internal dimensions of the structure L~10 m, and the anticipated velocities U~10 m/s, the representative Reynolds number would be UL/m~6×10$^6$, indicating turbulent flow. Thus k-ε turbulence model was used. The calculations were performed with a commercial CFD package (CFD Fluent, 2012) on a 16-core AMD Opteron, 32 Gb RAM workstation. Several mesh sizes were used to ensure 99% or better mesh convergence. For the results presented here, this resulted in the computational domain discretized with 500,000 to 750,000 (depending on the specific geometry) two-dimensional unstructured mesh elements, as FIG. 15 shows. Calculations were performed with double precision, the iteration error range was set not to exceed 10$^{-6}$ (10$^{-9}$ for the energy equation). Under these conditions, the solutions converged in less than 2000 iterations for all cases.

At the entrance to the collector, the temperature and pressure were set to be T$_0$ and p$_0$, at the exit of the chimney T$_1$ and p$_1$. The latter value takes into account both the change in pressure in the atmosphere and the pressure drop added to account for the turbine effects. The outer radius of the collector was maintained at 1753 m for all the numerics, leading to the collector area of about 9.6 km$^2$. This choice was dictated by the largest grid size that could reasonably be used while maintaining grid convergence at 99% or better. To simplify the calculations, the boundary conditions both at the collector surface and on the chimney wall were assumed to be convective, while the ground served as the source of constant heat flux at 770 W/m$^2$. The chosen tower geometries are characterized by comparable surface and foundation areas, so the construction costs of all three designs would be similar (see FIG. 15).

Figure 16:
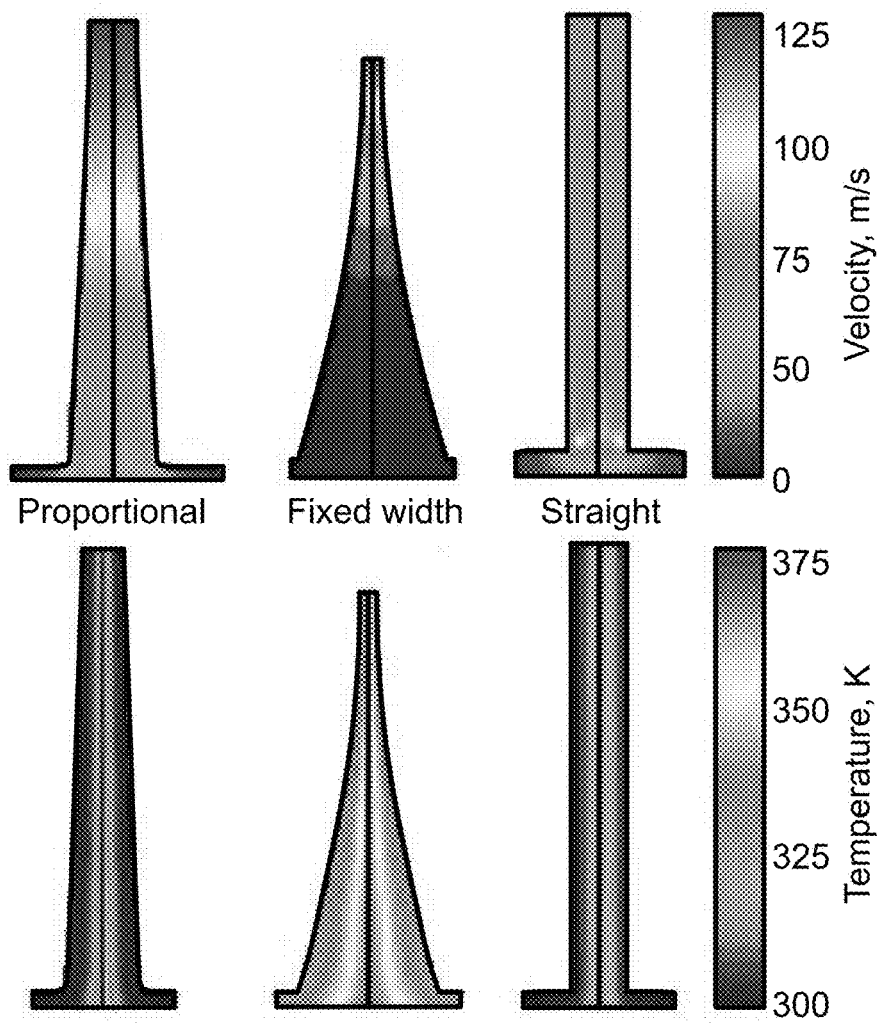
FIG. 16 shows the results of numerical simulation of the air flow in solar updraft towers of different shapes (top row—velocity, bottom row—temperature, no $DP_T$ pressure drop). Left—proportional shape with decreasing inner cross-section computed using Eqs. (10) and (11) with V=2000. Center—fixed-height shape computed using Eq. (9) with same V value. Right—reference straight tower with the same vertical cross-sectional area as the proportional tower. The vertical extent of the images is 1 km.

FIG. 16 shows the velocity and temperature maps inside the chimney for all three tower shapes. There are notable differences in the flow behavior, particularly prominent when the straight tower is compared with the fixed-height tower. For the former, velocity distribution is much more uniform, and the exit velocity is appreciably lower. The temperature at the core of the fixed-height tower is also much higher.

The pressure drops included in the boundary condition p$_1$ to simulate turbine losses (from stator, rotor, and diffuser) were estimated as follows. The efficiency of a turbine can be written in terms of total (inlet-to-exit) pressure loss $\Delta P_T$ as $$\eta_u = \left(1 + \frac{\Delta P_T}{\rho \Delta H}\right)^{-1}. \tag{14}$$

Here q is average density, and ΔH is the change in stagnation enthalpy. Eq. (14) was used at a given location (e.g., bottom or top of the chimney) to estimate the pressure drop for known average flow parameters and prescribed efficiency η. Then the pressure drop is included into the outlet pressure condition p$_1$, and the numerical calculation and subsequent estimation of the pressure drop repeated, usually providing convergence within 95% within two cycles of iteration. One more aspect of the flow the model does not take into account is the mixing in the flow due to the presence of the turbine, which is likely to affect the temperature and velocity fields.

Estimating the pressure drops, while not at all rigorous, produces plausible values that manifest reasonable change with assumed location of the turbine—higher at the bottom of the chimney, lower near its top. Table 1 presents the quantitative results obtained for the geometries and pressure drops described above. In the first three columns, Table 1 lists the case number, the tower shape (proportional, fixed-height or straight), and the assumption about the turbine location (none, top, or bottom of chimney). The fourth column presents the value of $\Delta P_t$ obtained by the iterative procedure described above.

TABLE 1

Results of numerical simulations for different tower geometries and different assumptions about turbine placement and corresponding pressure drops. Lables Fixed" and "Prop." refer to fixed-height and proportional designs as described in the text. Kinetic energy fluxes ½ρu³A$_c$ are normalized by the value for the straight tower and maximum pressure drop. Turbine output, estimated as η$_u$ūA$_c$ΔP$_T$, is likewise normalized.

| Case | Tower shape | Assumed turbine location | ΔP$_T$, Pa | Scaled kinetic energy flux, top | Scaled kinetic, energy flux, bottom | Scaled turbine output estimate |
|---|---|---|---|---|---|---|
| 1 | Fixed | None | 0 | 1.91 | 0.01 | — |
| 2 | Prop. | None | 0 | 19.2 | 1.74 | — |
| 3 | Prop. | Top | 2048 | 14.0 | 1.27 | 0.47 |
| 4 | Prop. | Bottom | 4500 | 7.34 | 0.65 | 0.83 |
| 5 | Straight | None | 0 | 2.08 | 2.08 | — |
| 6 | Straight | Top | 2054 | 1.92 | 1.92 | 0.50 |
| 7 | Straight | Bottom | 4700 | 1.00 | 1.00 | 1.00 |

For example, in the case of the straight chimney with no turbine (Case 5), the pressure difference between the inlet and the outlet is 10,000 Pa. With the turbine at the bottom (Case 7), ΔP$_t$=4700 Pa, and the inlet-outlet pressure difference used in the simulation is reduced to 10,000−4700=5300

Pa. The next two columns show the fluxes of kinetic energy at the top and at the bottom of the chimney in the form ½ $\rho \bar{\mu}^{-3} A_c$, where $\bar{\mu}$ is average vertical velocity at the appropriate location (top or bottom of chimney), and $\rho$ and $A_c$ are density and cross-sectional area of the chimney at that location. All of these numbers are normalized by the value for the straight chimney with the highest pressure drop. The last (seventh) column shows the estimate of the power output using the assumed pressure drop $\Delta P_t$ at the chosen location (top or bottom of the chimney, according to column 3), and the value of turbine efficiency $\eta_t$ used in the same calculation. These fluxes show total extractable kinetic and pressure energy, without making any further assumptions about the turbine efficiency (with one implicit assumption used to estimate $\Delta P_t$).

Case 1 (Fixed height tower shape, no $\Delta P_t$) was characterized by a very poor mass flow rate (8.2 times worse than the proportional tower) and kinetic energy flux, so that further cases for this geometry were not considered. This is not at all surprising, considering the strong role of the acceleration pressure drop in the chimney which the converging design exacerbates. However, this does not rule out the use of the fixed-height shape altogether, because it may be feasible to decouple the outside shape of the tower from its inside shape, e.g., by placing an expanding funnel inside a very wide fixed-height tower. The straight tower produces a little more turbine power (16% for the bottom turbine location and maximum associated pressure drop) than the proportional tower. Thus the performance penalty for the proportional tower shape is quite modest.

Some interesting conclusions can also be derived from the results for kinetic and pressure energy fluxes, if these results are considered in the context of the power extraction technique. Modern wind turbines (referred to as lift turbines) use aerodynamic lift on their blades to extract a fraction of the kinetic energy of the flow. Drag turbines, relying on the force (and thus pressure) of the wind to power them, are also possible, however, lift turbines are usually about twice as efficient as the drag turbines in extracting energy from the flow. There are also devices specifically designed to combine extraction of energy from lift and from drag (Savonius rotors, etc.). Table 1 shows that for a straight chimney and a prescribed pressure drop, there is no advantage in extracting kinetic energy near the top or near the bottom of the chimney. This will not be the case, however, for a converging chimney, where the kinetic energy flux is greater near the top. Thus, if kinetic energy is harvested, top turbine placement might be worth some consideration. The preferable drag turbine placement for the same chimney shape, on the other hand, would favor the bottom of the chimney.

For a practical decision on the turbine placement, additional factors must be considered. Bottom turbine placement is favorable for service access (although an inflatable tower with a turbine placed near the top can be deflated for turbine service). A slower-rotating and larger turbine located near the bottom of the tower may be more expensive to maintain (because a reductor mechanism will be necessary) and may have lower efficiency. Another consideration pertinent to the turbines located near the bottom of the tower is that the flow enters in the radial direction from the collector to drive an axial turbine. That transition area could likely benefit from some optimization.

A well-known equation for the peak theoretical power $P_{max}$ of a wind turbine, which disregards the contribution of pressure and just accounts for kinetic energy capture, can be written as $$P_{max} = \frac{16}{27} \frac{\rho A_c \bar{u}^3}{2} \quad (15)$$

Here the ratio 16/27 is known as the Betz limit (Betz, 1920), or, more accurately, as the Lanchester-Betz-Joukovsky limit (van Kuik, 2007). It refers to the maximum amount of kinetic energy of the flow of average density $\rho$ and average velocity $\bar{u}$ traversing the area $A_c$ swept by the rotor of the wind turbine that can be converted to work. Many modern turbines have effective performance within 15% of that theoretical limit. The Lanchester-Betz-Joukovsky limit, however, does not apply to turbines in channels, which can actually produce more power than freestanding wind turbines. Thus columns 5 and 6 of Table 1 present (with normalization and no assumed coefficients) the same quantity as Eq. (15).

Another power estimate for a turbine in a solar chimney $N_{el}$ (Schlaich, 1995) is $$N_{el} = \eta_t \Delta P_T \dot{V}, \quad (16)$$

where $\eta_t$ is a coefficient including the efficiencies of the turbine, gearing, and the generator, $\Delta P_t$ is the pressure drop at the turbine, and $\dot{V} = \bar{\mu} A_c$ is the volumetric flow rate. Eq. (16) is effectively the same as one used to populate column 7 of Table 1.

As a check, a numerical simulation of the Manzanares plant with the present invention and simple boundary conditions consistent with those used by other researchers (Table 2) was conducted using the same assumption as Sangi et al. (2011) (trivial inlet-outlet pressure difference). Close agreement with the reported data (average outlet velocity 14.9 m/s, turbine output estimate 49 kW) was obtained.

TABLE 2

Boundary conditions used for modeling the Manzanares power plant.

| Position | BC type | Note |
|---|---|---|
| Collector inlet | Pressure inlet | $\Delta P \sim 0$ |
| Collector ground | Wall | Heat flux 1000 W/m² |
| Collector roof | Wall | Adiabatic |
| Chimney wall | Wall | Adiabatic |
| Chimney axis | Axis | Axial symmetry |
| Chimney outlet | Pressure outlet | $\Delta P \sim 0$ |

Figure 17:
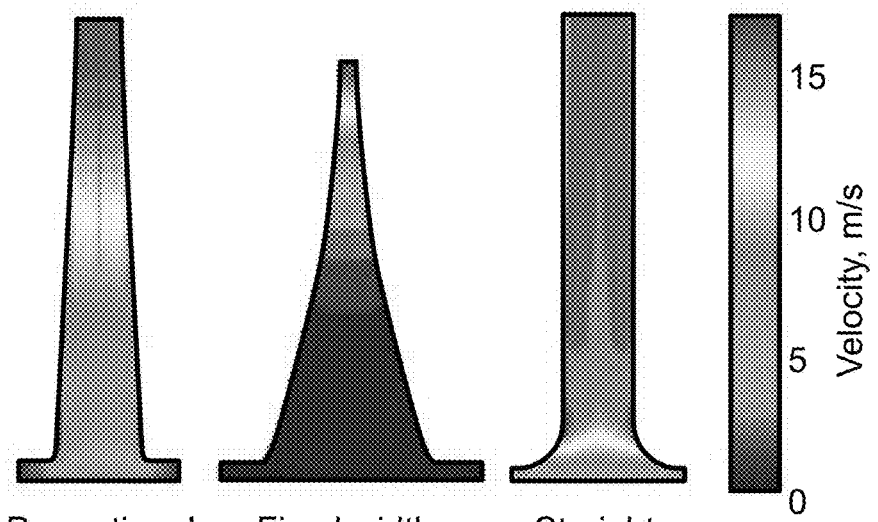
FIG. 17 shows the velocity maps for the flow with no inlet-to-outlet pressure drop.

For a 1 km tower, modeling with a trivial inlet-outlet pressure drop would at least represent an interesting limit case, which was considered for the same three tower shapes as shown in FIG. 16. For all geometries, this modeling produced much reduced velocities at the tower exit (FIG. 17, Table 3). The straight chimney still produces the highest mass flow rate, but again, the proportional design does not fare too badly either—the decrease in kinetic energy flux compared with the straight design is only about 20%. The most realistic values for the exit velocities are likely somewhere in between the maxima and minima from Table 3, perhaps closer to the lower end of the range.

TABLE 3

Average exit velocities for different tower shapes and the cases of 10,000 Pa versus zero inlet-outlet pressure difference. Pressure drop due to the turbine is not considered here.

| | Fixed | Proportional | Straight |
|---|---|---|---|
| Case of 10,000 Pa, m/s | 111.1 | 123.0 | 58.0 |
| Case of no pressure drop, m/s | 16.1 | 15.3 | 12.6 |

The proposed designs of the present invention make it possible to radically reduce the challenges associated with the construction of a solar updraft tower, with the potential to greatly simplify the construction of solar updraft facilities and to make solar-generated dispatchable power available in a variety of locations. Realistic optimization considerations for the design lead to elegant analytic solutions of freestanding towers comprised of a stack of soft toroidal shells made from widely available materials. Replacing a traditional updraft chimney with such a tower will also result in a significant reduction in the upfront construction cost. The inflatable updraft tower shape dictated by stability considerations is less than optimal for producing the optimal internal flow, however, the penalty may be a fair tradeoff for the simplification of construction and cost reductions.

While the foregoing written description enables one of ordinary skill to make and use what is considered presently to be the best mode thereof, those of ordinary skill will understand and appreciate the existence of variations, combinations, and equivalents of the specific embodiment, method, and examples herein. The disclosure should therefore not be limited by the above described embodiments, methods, and examples, but by all embodiments and methods within the scope and spirit of the disclosure.

What is claimed is:

1. A self-supporting chimney apparatus, the apparatus comprising:
    a plurality of isolated toroidal tubes stacked coaxially on top of one another, said tubes having sidewalls, the sidewalls comprising at least one inflatable compartment, the at least one inflatable compartment being filled with a gas;
    a gas control system that dynamically adjusts the pressure in one or more of said compartments to dynamically adjust the apparatus to minimize the deflection of the apparatus under variable wind loading, said gas control system comprising a pressure sensor, a first valve adapted to vent gas in a compartment into the atmosphere, a second valve connected to a high-pressure reservoir, said second valve releases gas from said high-pressure reservoir into a compartment, and said high pressure reservoir adapted to receive gas from a pump; and
    a central passageway defined by said stacked tubes.

2. The apparatus as set forth in claim 1 wherein each toroidal compartment comprises:
    a. a plurality of stacked toroidal tubes, each of said tubes having a large radius $q_i$, and an elliptical cross-section, with elliptical cross-section having semi-axes $h_i$ and $r_i$, where i is the number of the toroidal compartment such that i=1 for the lowest toroidal compartment, i=2 for next toroidal compartment and so on until i=i for the ith toroidal compartment, the ith toroidal compartment forming the top edge of the sidewalls; and
    b. a central void.

3. The apparatus of claim 2 wherein said chimney can bend 90-degrees without occluding the chimney.

4. The apparatus of claim 2 further including a greenhouse, said greenhouse having an inlet, an outlet and a roof, said roof converges downwardly from said inlet to a mid-section and diverges upwardly from said mid-section towards said outlet.

5. The apparatus of claim 4 wherein the outlet is larger than the inlet.

6. The apparatus of claim 4 further wherein said greenhouse further includes a base, said base converges upwardly from said inlet towards a mid-section and diverges downwardly from said midsection towards an outlet.

7. A self-supporting chimney apparatus, the apparatus comprising:
    a plurality of isolated toroidal tubes stacked coaxially on top of one another, said tubes having sidewalls, the sidewalls comprising at least one inflatable compartment, the at least one inflatable compartment being filled with a gas;
    a central passageway defined by said stacked tubes;
    said central passageway connected to a greenhouse, said greenhouse having an inlet and an outlet, said outlet in communication with said central passageway; and
    a gas control system that dynamically adjusts the pressure in one or more of said compartments to dynamically adjust the apparatus to minimize the deflection of the apparatus under variable wind loading, said gas control system comprising a pressure sensor, a first valve adapted to vent gas in a compartment into the atmosphere, a second valve connected to a high-pressure reservoir, said second valve releases gas from said high-pressure reservoir into a compartment, and said high pressure reservoir adapted to receive gas from a pump.

8. The apparatus of claim 7 wherein said stacked tubes are arranged such that the profile of the chimney is in the shape of an exponential curve.

9. The apparatus of claim 7 wherein said chimney can bend 90-degrees without occluding the chimney.

10. The apparatus of claim 7 wherein the outlet is larger than the inlet.

11. The apparatus of claim 7 wherein said greenhouse has an upper section, said upper section having a mid-section, from said inlet to said mid-section said upper section slopes downwardly and slopes upwardly from said mid-section to said outlet.

12. The apparatus of claim 11 wherein said greenhouse further includes a lower section opposingly located from said upper section, said lower section having a mid-section, from said inlet to said mid-section, said lower section slopes upwardly and slopes downwardly from said mid-section to said outlet.

* * * * *